United States Patent
Terada

(10) Patent No.: US 7,057,109 B2
(45) Date of Patent: Jun. 6, 2006

(54) GUIDE PROTECTOR FOR HARNESS, WIRE-EXCESSIVE PORTION ABSORBING STRUCTURE THEREWITH, AND FIXING METHOD OF GUIDE PROTECTOR FOR HARNESS

(75) Inventor: Tomoyasu Terada, Kosai (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/950,415

(22) Filed: Sep. 28, 2004

(65) Prior Publication Data

US 2005/0124179 A1    Jun. 9, 2005

(30) Foreign Application Priority Data

Dec. 5, 2003   (JP)   ............................ P2003-406895

(51) Int. Cl.
*H02G 1/00*   (2006.01)

(52) U.S. Cl. .................. 174/72 A; 174/135; 174/154
(58) Field of Classification Search .............. 174/72 A, 174/68.3, 73.1, 154, 135
See application file for complete search history.

(56) References Cited

U.S. PATENT DOCUMENTS

| | | | |
|---|---|---|---|
| 6,517,365 B1 * | 2/2003 | Bungo et al. ................ | 439/162 |
| 6,575,760 B1 * | 6/2003 | Doshita et al. ................ | 439/34 |

FOREIGN PATENT DOCUMENTS

| | | |
|---|---|---|
| DE | 103 32 342 A1 | 2/2004 |
| JP | 9-20189 A | 1/1997 |
| JP | 2001-19282 A | 1/2001 |
| JP | 2005/057888 A | 3/2005 |

* cited by examiner

*Primary Examiner*—Jinhee Lee
(74) *Attorney, Agent, or Firm*—Sughrue Mion, PLLC

(57) ABSTRACT

The guide protector for harness includes a guide main body and a cover, said guide main body for slidably inserting, from one side to the other side, an electric wire drawn from a wire-excessive portion absorbing device of absorbing the portion of the excessive length of the wire, and said cover of protecting the opening of said guide main body and preventing the wire from rising, and the wire-excessive portion absorbing device and the guide main body are separately constructed, and a wire guiding part is provided in curve for restraining the leading direction of the wire at a wire leading side of the guide main body, so that the wire is pulled following the guiding face of the side of the luggage door.

5 Claims, 5 Drawing Sheets

GUIDE PROTECTOR FOR HARNESS, WIRE-EXCESSIVE PORTION ABSORBING STRUCTURE THEREWITH, AND FIXING METHOD OF GUIDE PROTECTOR FOR HARNESS

BACKGROUND OF THE INVENTION

1. Field of the Invention

The present invention relates to a guide protector for harness, a wire-excessive portion absorbing structure therewith, and a fixing method of the guide protector for harness, said guide protector for harness (called as "harness-guide protector" hereafter) being applied to cars such as automobiles and placed between a wire-excessive portion absorbing device at a stationary side and a door of a moving side provided to the stationary side in an open-closing manner in order to guide in a desired direction an electric wire drawn from the wire-excessive portion absorbing device in company with a door opening-closing action.

2. Field of the Invention

In a car door as a moving body of the opening and closing manner, for example, in an out-opening luggage door or rear door, or a sliding rear door, there are, if needed, mounted a power window motor, a door lock unit, a switch unit, an auto-door unit, or lamps, and these car parts are applied with electric current from a battery or ECU through wires such as a flexible flat cable.

Wires used to many kinds of doors have much moving amount brought with the opening and closing actuation of the doors, and when the door closes, a portion of an excessive length is produced, and this portion is often caught between the car body and the door, and injured. Therefore, a wire-excessive portion absorbing device is equipped at the car body of the stationary side.

The conventional art example shown in FIG. 5 is concerned with the wire-excessive portion absorbing device. This conventional art example is composed of the electric wire 71, a case 61 comprising a case main body 62 and a cover 65, and an excessive portion absorbing unit 67 housed in the case 61.

The case main body 62 is a box of a laterally long and rectangular shape having an opening. The cover 65 is for closing the opening of the case body 62, provided at its frame wall 62a with a catching piece (not shown), and is provided at its end wall 65a with a catching projection (not shown). If engaging the catching piece and the catching projection, the cover 65 is attached to the case main body 62.

The wire-excessive portion art absorbing unit 67 comprises a seat member, a guide pin 68, a compression coil spring 69, and a moving roller 70. The guide pin 68 is disposed in a length direction of the case main body 62, and secured, at its end part of one side, to a rear wall of the case main body 62 via the seat member.

A compression coil spring 69 is furnished outside with a guide pin 68 so as to urge to pull the wire 71 into the case 61. The moving roller 70 has a belly part and is attached to the guide pin 68, and this moving roller 70 reciprocates in the harness pulling and drawing directions under a condition of folding the wire 71 in U-turn.

Japanese Unexamined Patent Publication Hei. 9-20189 shown in FIG. 6 is also concerned with the wire-excessive portion absorbing device 75 of absorbing the portion of the wire excessive lemgth similarly to the above mentioned conventional art example. The wire 80 has the excessive length portion 81 near a hinge (not shown) connecting the car body (not shown) and the door (not shown), and this excessive length portion 81 is housed in the case 87. The case 87 has back and forth a wire inlet mouth 89 and a wire outlet mouth 90, and the wire 80 is pulled into the wire inlet mouth 89 and drawn from the wire outlet mouth 90.

The wire 80 is supported by a stationary member 82 and a movable member 83 and is folded in double. The movable member 83 is always urged backward by the compression coil spring 86 as an urging member. Forward of the movable member 83, a guide member 85 is furnished within the compression coil spring 86.

A side wall 91 of the case 87 is formed with a slit-like guiding groove 92 for guiding a core 84 of the movable member 83. When the door closes, the movable member 83 is urged backward, and the core 84 contacts the rear end of the guiding groove 92. When the door opens, the movable member 83 pushes the compression coil spring 86, and the core 84 contacts the front end of the guiding groove 92. Accordingly, when the door opens and closes, the wire 80 always tenses, and the wire excessive portion 81 is prevented from being caught between the car body and the door and being injured.

Unexamined Japanese Patent Publication 2001-19282 is concerned with the wire-excessive portion absorbing device of avoiding occurrence of rattling or abnormal noises. This conventional art example comprises coiling rollers having a first and second wire coiling parts, two wire leading parts, and a casing for receiving the coiling rollers urged in the wire pulling direction by a spiral power spring, and provided with electric wire coiling pieces radially extending outside of the wire coiling parts on circumferences of the first and second wire coiling parts.

Since the wire coiling seat always contacts the wire and tension acts on the wire, loosening of the wire excessive portion is corrected, and rattling is avoided around the wire coiling part, and durability of the wire is heightened.

However, the above mentioned conventional art examples are involved with problems to be solved as follows.

The first conventional art example has a problem that since the wire guiding part 64 unified as one body with the wire outlet mouth 63 expands outside of the case 61, the thickness of the case 61 increases, and the case 61 becomes bulky up and down. For decreasing the outside expansion of the case 61 of the wire guiding part 64, if forming the wire guiding part 64 in curve of small radius, tension acting on the wire portion curved following the wire guiding part 64 becomes large, and the wire 71 cannot be pulled smoothly.

Further, if the length of the wire 71 running between the stationary side and the movable side changes because of kinds or grades of cars, the wire-excessive portion absorbing device must be exchanged in response to the specification of the car, and the wire-excessive portion absorbing device as one of the car parts cannot be used for multi-purposes or in common, so that a problem of high cost occurs.

The second conventional art example does not have the wire guiding part for guiding the case 87 in drawing direction, and therefore if the wire 80 is drawn obliquely from the case 87, the wire 80 interferes with an edge of the wire outlet mouth 90, and is caused with abrasion by the repeatedly opening and closing actions of the door. That is, when the wire 80 is drawn straightly from the case 87, this conventional art example is useful without injuring or breaking the wire, but if the wire 80 is drawn as being bent, it is possibly injured, and in particular, if the opening and closing action of the door is done for a long period, the wire is probably broken.

The third conventional art example leads the wire in a direction near the coiling roller from the wire leading part of the case, and if the wire leading direction is limited similarly to the second conventional art example and the wire is drawn as being bent, it is possibly caused with the injure as abrasion.

SUMMARY OF THE INVENTION

In view of the above mentioned circumstances, the invention aims at having such parts to be for general-purposes and used in common, and is to provide a harness-guide protector and a wire-excessive portion absorbing structure therewith, which can flexibly deal with changing in kinds or grades of cars, and a fixing method of the guide protector for harness.

For accomplishing the above mentioned object, the first aspect of the invention is a guide protector for harness, comprising a guide main body and a cover, said guide main body for slidably inserting, from one side to the other side, an electric wire drawn from a wire-excessive portion absorbing device of absorbing the portion of an excessive length of the wire, and said cover of protecting the opening of said guide main body and preventing the wire from rising, wherein said wire-excessive portion absorbing device and said guide main body are separately constructed, and a wire guiding part is provided in curve for restraining the leading direction of the wire at a wire leading side of the guide main body, so that the wire is guided following the guiding face of said wire guiding part.

According to the above mentioned structure, the wire drawn from the wire-excessive portion absorbing device is inserted into the harness-guide protector, so that the wire can be drawn in a desired direction, and further the wire can be protected from interference with the outside. If changing the positional relation between the wire-excessive portion absorbing device and the guide main body, it is possible to change the guiding length of the wire drawn from the wire-excessive portion absorbing device. Since the wire leading side of the guide main body is formed with the wire guiding part in curve, it is possible to smoothly guide the wire drawn from the wire-excessive portion absorbing device in company with the opening and closing actuation of the moving body as the door following the guiding face of the wire guiding part.

The second aspect of the invention is the harness-guide protector set forth in the first aspect, is characterized in that said wire guiding part is provided in curve at the same corner radius as or more than a minimum allowable bending radius of said wire.

According to the above mentioned structure, the curved portion of the wire bent following the guiding face of the wire guiding part is not concentrated with locally repeated bending stress, and this locally repeated bending stress is dispersed.

The third aspect of the invention is the harness-guide protector set forth in the first or second aspect, characterized in that said wire guiding part is projected from the end portion of said cover, and a wall part opposite to the guiding face of said wire guiding part is released.

According to the above mentioned structure, it is possible to curve the wire drawn from the wire-excessive portion absorbing device in response to the opening or closing angle of the movable body, so that the opening or closing action of the movable body is smoothly carried out.

The fourth aspect of the invention is characterized by providing the harness-guide protector set forth in any one of the first to third aspects and the wire-excessive part absorbing device for absorbing the portion of the wire excessive length.

According to the above mentioned structure, it is possible to smoothly absorb the portion of the wire excessive length when opening and closing the moving body, and avoid occurrence of abnormal noises caused by the wire rattling.

The fifth aspect of the invention is, in the wire-excessive portion absorbing structure, characterized in that said wire-excessive portion absorbing device comprises a moving roller for coiling the electric wire, a compression coil spring, and a guide pin, said moving roller reciprocating within said wire-excessive portion absorbing device, said compression coil spring urging said moving roller in a wire pulling direction, and said guide pin being furnished outside with the compression coil spring for linearly moving said moving roller According to the above mentioned structure, for example, when the car door as the moving body opens, tensile force acts on the portion of the excessive length of the wire received in the wire-excessive portion absorbing device, and while being guided by the guide pin, the moving roller moves in a direction against the urging force of the compression coil spring, and the wire is drawn outside of the wire-excessive portion absorbing device. On the other hand, when the door closes, the moving roller moves in a direction receiving the urging force, so that the portion of the wire excessive length is pulled within the wire-excessive portion absorbing device.

The sixth aspect of the invention is characterized by fixing the harness-guide protector set forth in any one of the first to third aspects, and rendering said wire guiding part to face, at its front end, a trunk of a moving side of the car body.

According to the above mentioned structure, even if loading large force on the harness-guide protector, it is avoided from coming off, and the wire is avoided from interfering with other parts in the trunk room or being caught between the upper buckling force and the trunk room.

According to the invention of the first aspect, since the wire-excessive portion absorbing device and the guide main body are separately structured, if changing the positional relation between the wire-excessive portion absorbing device and the guide main body, it is possible to freely change the guiding length of the wire drawn from the wire-excessive portion absorbing device. Since the wire leading side of the guide main body is formed in curve with the wire guiding part, it is possible to smoothly guide the wire following the guiding face of the wire guiding part, said wire being drawn from the wire-excessive portion absorbing device/pulled by the wire-excessive portion absorbing device in company with repeated opening and closing the moving body. Accordingly, the wire-excessive part absorbing device and the harness-guide protector can be used for multi-purposes and in common, and can flexibly deal with changing in kinds or grades of cars. Besides, the designing freedom goes up, and costs for parts can be lowered. Further, it is possible to avoid the wire from injury or breakage, and maintain reliability of the electrical connection of the wire for a long period.

According to the invention of the second aspect, the curved portion of the wire bent following the guiding face of the wire guiding part is not concentrated with locally repeated bending stress. Therefore, the wire injury or breakage are avoided, so that the current supplying structure can be offered with high reliability.

According to the invention of the third aspect, since the wall part opposite to the guiding face of the wire guiding part is released, it is possible to curve the wire drawn from the wire-excessive portion absorbing device in response to the opening or closing angle of the movable body, so that the wire drawn from the wire-excessive portion absorbing device can be easily curved, and the opening or closing action of the movable body is smoothly carried out.

According to the invention of the fourth aspect, with the harness-guide protector and the wire-excessive portion absorbing device, it is possible to smoothly absorb the portion of the wire excessive length when opening and closing the moving body, and avoid occurrence of abnormal noises caused by the wire loosening. Therefore, the opening-closing property rise, and the connecting reliability and quietness go up.

According to the invention of the fifth aspect, it is possible to prevent the wire from breakage by the tensile force acting on the wire when opening and closing the moving body, or from injury as breakage caused by the wire excessive portion caught between the side of the car body and the side of the moving body.

According to the invention of the sixth aspect, since the harness-guide protector is fixed to the upper buckling force, even if loading large force on the harness-guide protector, it is avoided from coming off. Since the wire guiding part faces the trunk at its front end, the wire is avoided from interfering with other parts in the trunk room or being caught between the upper buckling force and the trunk room.

DETAILED DESCRIPTION OF THE PREFERRED EMBODIMENTS

Figure 1:
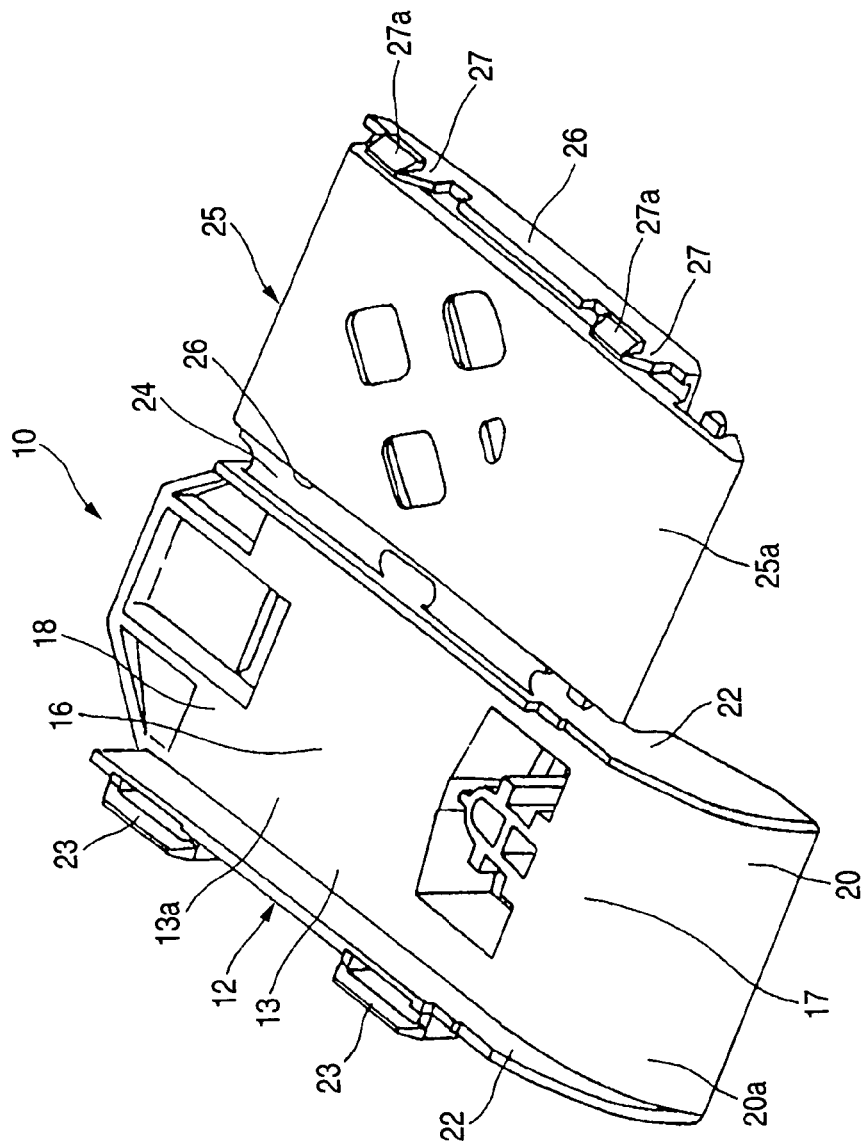
FIG. 1 is a perspective view showing one embodiment of the harness-guide protector according to the invention, opening the cover.

In the following description, the specified embodiment of the invention will be explained with reference to the attached drawings. FIGS. 1 to 4 show one embodiment of the harness-guide protector, the wire-excessive portion absorbing structure therewith, and the fixing method of the harness-guide protector.

The harness-guide protector 10 is one of the car parts secured to the upper buckling force 52 of the stationary side for guiding the wire 53 drawn from the wire-excessive portion absorbing device 30 together with the opening-closing actuation of the luggage door (movable body) 50 or the sliding door, and the harness-guide protector 10 is separately constructed from the wire-excessive portion absorbing device 30. The door includes an out-opening rear door and other many kinds of opening-closing bodies other than the luggage door 50 or the sliding door.

The wire-excessive portion absorbing device 30 is a wire coiling device secured to the car body 54 for absorbing the portion (loosed part) of the excessive length of the wire 53 running between the car body 54 and the luggage door 50. Within the device, there are furnished the reciprocating moving roller 46 for coiling the wire, the compression coil spring 47 of urging the moving roller 46, and the guide pin 45 furnished outside with the compression coil spring 47. Details will be stated later.

The harness-guide protector 10 of this embodiment aims at using of the parts for multi-purposes or in common, can flexibly deal with changing in kinds or grades of cars, and can prevent the wire from injury or breakage caused by repeatedly opening and closing the luggage door. The guide protector for harness comprises the guide main body 12 and a cover 25, said guide main body 12 slidably inserting, from one side to the other side, the wire 53 drawn from a wire-excessive portion absorbing device 30 of absorbing the portion of the excessive length 53a of the wire 53 running between the car body 54 and the luggage door 50, and said cover of protecting the opening 16 of said guide main body 12 and preventing the wire 53 from rising, and is characterized in that the wire-excessive portion absorbing device 30 and the guide main body 12 are separately constructed, and the wire guiding part is provided in curve for restraining the leading direction of the wire 53 at the wire leading side 17 of the guide main body 12, so that the wire is guided following the guiding face of said wire guiding part. The wire guiding part 20 is provided in curve with a corner radius which is equal to or greater than the minimum allowable bending radius of the wire 53, and the wall part opposite to the guiding face 20a of the wire guiding part 20 is usefully formed.

Figure 2:
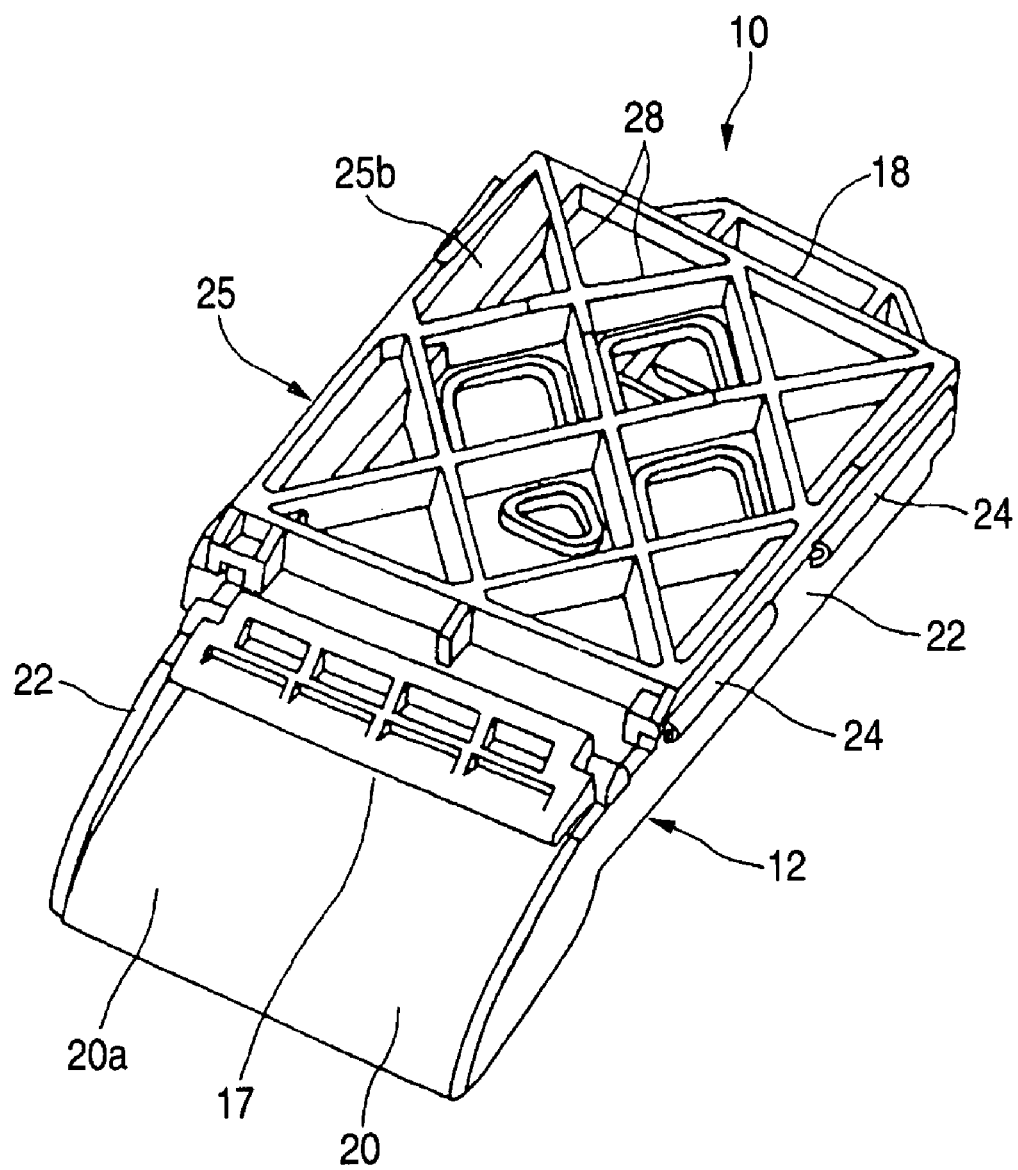
FIG. 2 is a perspective view of closing the cover of the harness-guide protector shown in FIG. 1.

In the following description, detailed explanations will be made to the harness-guide protector 10, the wire-excessive portion absorbing structure therewith, and the fixing method of the harness-guide protector 10 and their works. As shown in FIGS. 1 and 2, the harness-guide protector 10 is composed of the guide main body 12 for inserting the wire 53 and the cover 25 for protecting the opening 16 of the guide main body 12.

The electric wire 53 (FIG. 4) is applied with a flexible flat cable (FFC) covered with a protecting part made of an insulating substance on the circumference of the parallel and band-like wire conductor. The wire 53 is enough with any flexible material and with a flexible print circuit (FPC, not shown) or other flat wires. Since FFC or FPC is thin in thickness and easily bent in the thickness direction, even if the excessive portion 53a is folded in U-shape and received in the wire-excessive portion absorbing device 30 (FIGS. 3 and 4), it is not injured nor lose reliability in the electrical connection.

The guide main body 12 is composed of a synthetic resin such as polypropylene or polyethylene, and is formed by an injection molding. An outer wall is formed with a base wall 13 and edge walls 22 standing on both ends of the base wall 13. A ceiling side opposite to the base wall 13 is released, and is fitted thereon with the cover 25. The wire 53 is led into the guide main body 12 from the rear side, led from the front side thereof, and is slidably inserted in the guide main body 12.

The wire leading side 17 is unified as one body with the wire guiding part 20. Since this wire guiding part 20 is provided in curve with a corner radius which is equal to or greater than the minimum allowable bending radius of the wire 53, the wire 53 guided following the wire guiding part 20 may smoothly move in the tension direction. The wire 53 contacting the curved face (guiding face) 20a of the wire guiding part 20 is prevented from concentration of the bending stress. The wire guiding part 20 is extended at both sides with the walls 22, so that the wire 53 is positioned in the width direction and prevented from laterally sliding.

As shown in FIG. 2, since the wire guiding part 20 projects forward or downward from the front end of the cover 25 under the condition that the cover 25 protects on the guide main body 12, the ceiling side opposite to the curved face 20a is released. Therefore, when opening and closing the luggage door 50, the wire can be easily curved (FIG. 3), the opening-closing actuation of the luggage door 50 can be smoothly carried out.

A wire inlet side 18 is defined with an opening encircling the four sides, into which the wire 53 drawn from the wire-excessive part absorbing device 30 is not hooked but straightly guided.

The inside 13a of the base wall 13 is a sliding face for the wire 53 drawn from the wire-excessive portion absorbing device 30, this face being smoothly formed not to hook the wire. The outside 13b (FIG. 4) of the base wall 13 is provided with an engaging part 14 for an engaging hole 52a of the upper buckling force 52, and if the engaging part 14 is in mesh with the engaging hole 52a, the harness-guide protector 10 is engaged with the upper buckling force 52.

The wall 22 is provided with an engaging frame 23 at the outside continuous to the one side of the base wall 13, the engaging frame 23 being hooked by an engaging pawl 27a of the cover 25, and if the engaging pawl 27a hooks the engaging frame 23, the cover 25 is engaged with the guide main body 12. The base wall 13 is formed with a hinge portion 24 at the wall 22 of the other side thereof. Around a rotation fulcrum of this hinge portion, the cover 25 protects the guide main body 12.

The cover 25 has a shape corresponding to the opening 16 excepting the wire guiding part 20 of the guide main body 12, and continues to the hinge portion 24 at the edge portion 26 of one side of the cover 25. The cover 25 is provided with an engaging piece 26 going into the engaging frame 23 formed at the wall 22 of the guide main body 12. The engaging piece 27 is projected with the engaging pawl 27a from the outside thereof, and if the engaging pawl 27a hooks the lower end of the engaging fame 23, the cover 25 engages the guide main body 12.

The inside 25a of the cover 25 is formed to be a flat face for the wire 53 inserted in the harness-guide protector 10 to smoothly slide, while an outside 25b of the cover 25 is provided with reinforcing ribs 28 so as to avoid the cover 25 from deformation.

Figure 3:
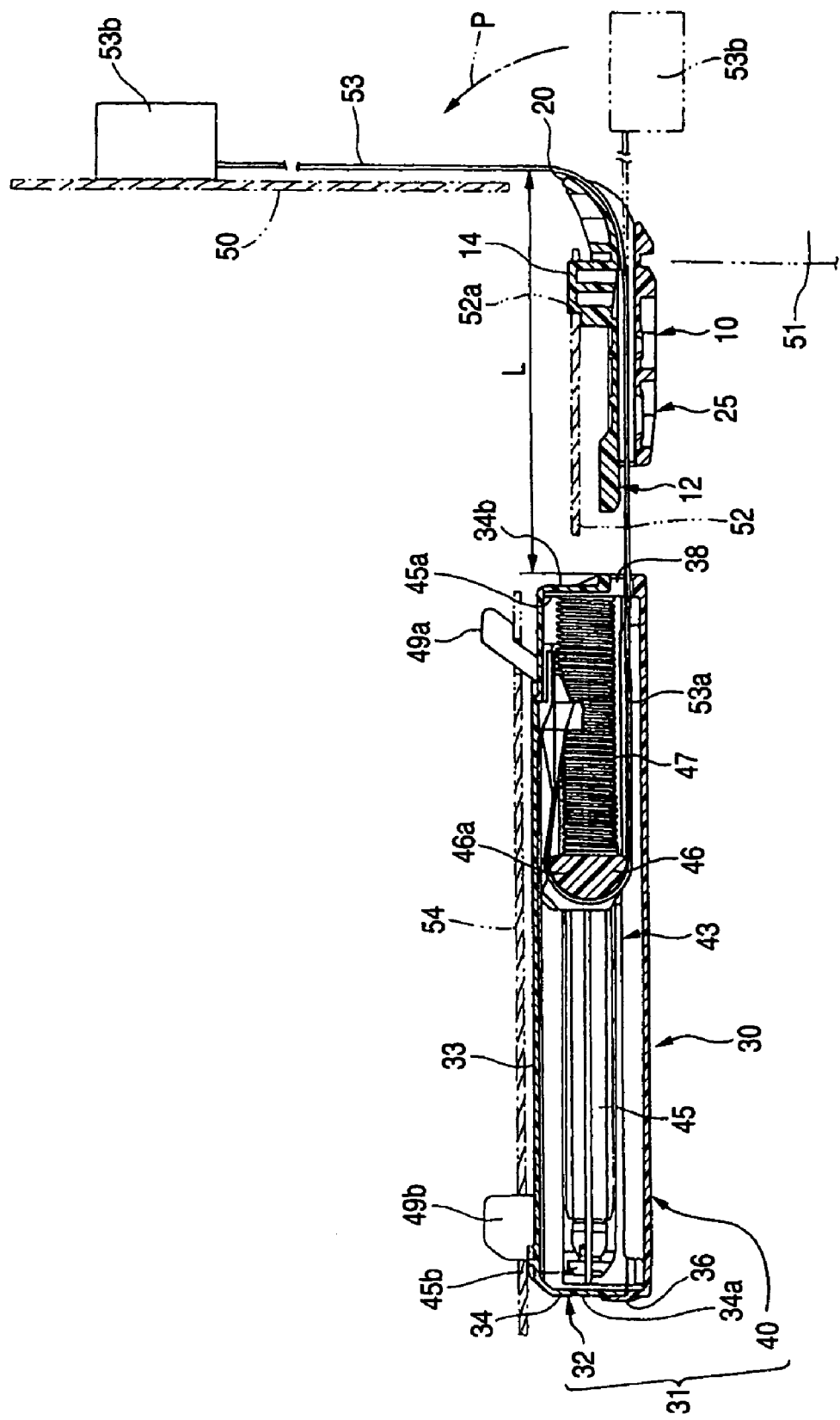
FIG. 3 is a cross sectional view showing the condition of arranging the harness-guide protector together with the wire-excessive portion absorbing device.

As shown in FIG. 3, the harness-guide protector 10 is secured at the end part of the upper buckling force 52 under a condition that the wire guiding 20 is faced at its front end to the inside of the trunk 51. If securing the harness-guide protector 10 in such a manner, the curved part of the wire 53 placed between the upper buckling force 52 and the luggage door 50 is prevented from interfering with other parts within the trunk 51 or from abrasion with the edges the upper buckling force 52 or the luggage door 50, so that the reliability in connection of the wire 53 is maintained for a long period.

Next, on the basis of FIGS. 3 and 4, explanation will be made to the work of the harness-guide protector 10 and the wire-excessive portion absorbing device 30. The harness-guide protector 10 is secured to the upper buckling force 52, and the wire-excessive part absorbing device 30 is secured to the car body 54, respectively. The harness-guide protector 10 is so arranged as to direct the wire guiding 20 toward the side of the luggage door 50 (trunk 51). The wire 53 drawn from the harness-guide protector 10 runs following the luggage door 50 and is connected via the connector 53b to a rear combination lamp or a rear wiper.

The harness-guide protector 10 is arranged at the wire leading side of the wire-excessive portion absorbing device 30, and the wire 53 drawn from the wire-excessive portion absorbing device 30 is straightly guided into and inserted in the harness-guide protector 10, and led out following the wire guiding part 20 of the harness-guide protector 10. When the luggage door 50 closes, the wire 53 is straightly led out from the wire outlet mouth of the harness-guide protector 10, while when the luggage door 50 opens, the wire 53 is curved in the opening direction P of the luggage door 50 following the curved face 20 of the wire guiding part 20.

Thus, the wire 53 drawn from the harness-guide protector 10 is smoothly curved from the horizontal direction to the vertical direction in company with the opening-closing actuation of the luggage door 50 under the non-loosened condition, so that the wire 53 is prevented from being caught between the upper buckling force 52 and the luggage door 50 or abrasion with the edge of the luggage door 50.

Further, since the harness-guide protector 10 and the wire-excessive portion absorbing device 30 are separately constructed, the guide part L of the wire 53 drawn from the wire-excessive portion absorbing device 30 can be freely changed in response to the car kinds or grades without exchanging the harness-guide protector 10 or the wire-excessive portion absorbing device 30, and the harness-guide protector 10 can flexibly deal with changing in the car kinds or grades.

The wire-excessive portion absorbing 30 is composed of the synthetic resin made case 31, an excessive portion absorbing unit 43 housed in the case 31, and the wire folded in U-turn in the excessive portion absorbing unit 43. FIG. 3 shows that the wire-excessive portion absorbing device 43 is turned over.

The case 31 comprises the case main body 32 placed at the upper side and the cover 40 placed at the lower side. The case main body 32 is shaped in box having an opening at the lower side, and comprises the base wall 33 of the upper side and a peripheral wall 34 continuously transverse with the edge of the base wall 33. The base wall 33 projects engaging parts 49a, 49b back and forth for the car body 54. The base wall 34 has a rectangular shape being long in the back and forth direction (the axial direction of the guide pin 45), and comprises a front wall 34a and a rear wall 34b being opposite each other, and wall parts 34c, 34c of both sides being opposite each other. The back and rear walls 34a, 34b and the walls 34c, 34c of both sides have the engaging frames 36 for catching the cover 40.

To the inside of the front wall part 34a, the guide pin 45 contacts at the front end 45b, and at the same time, the moving roller 46 urged by spring force of the compression coil spring 47 contacts. To the inside of the rear wall part 34b, the guide pin 45 contacts at a spring reception part 45a being the other end. Since the guide pin 45 is secured to the front wall part 34a and the rear wall part 34b by means of securing means (not shown), the guide pin 45 is avoided from slipping out from the case main body 32.

Further, the rear wall part 34b is formed with the wire outlet mouth 38 for pulling/drawing the wire 53. The wire outlet mouth 38 is formed to have an enough width than the width size of the wire 53, so that the wire 53 pulled/drawn is not injured at both sides by contacting the wire outlet mouth 38 when opening and closing the luggage door 50.

Figure 4:
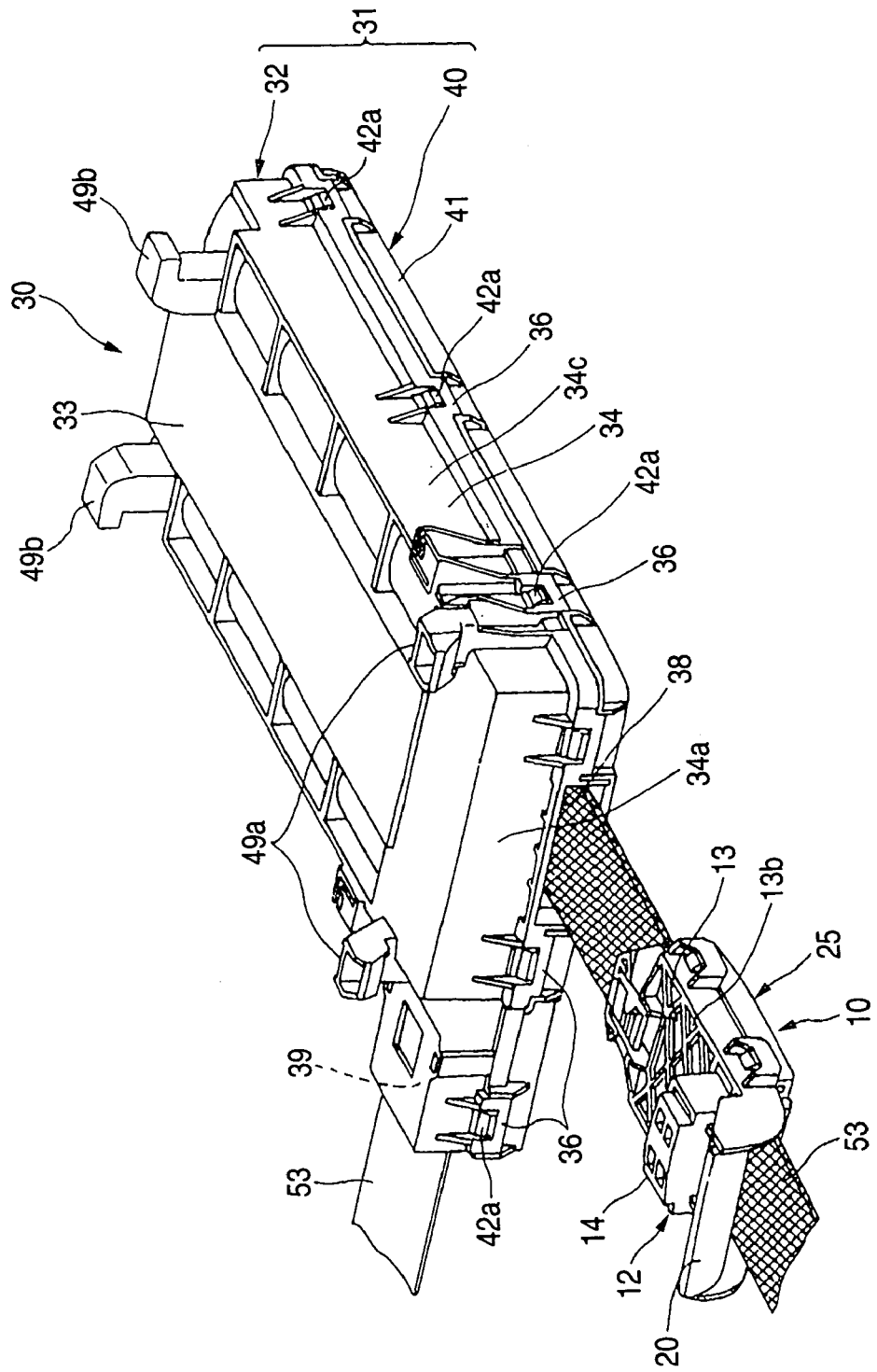
FIG. 4 is a perspective view showing the harness-guide protector and the wire-excessive portion absorbing device.
Figure 5:
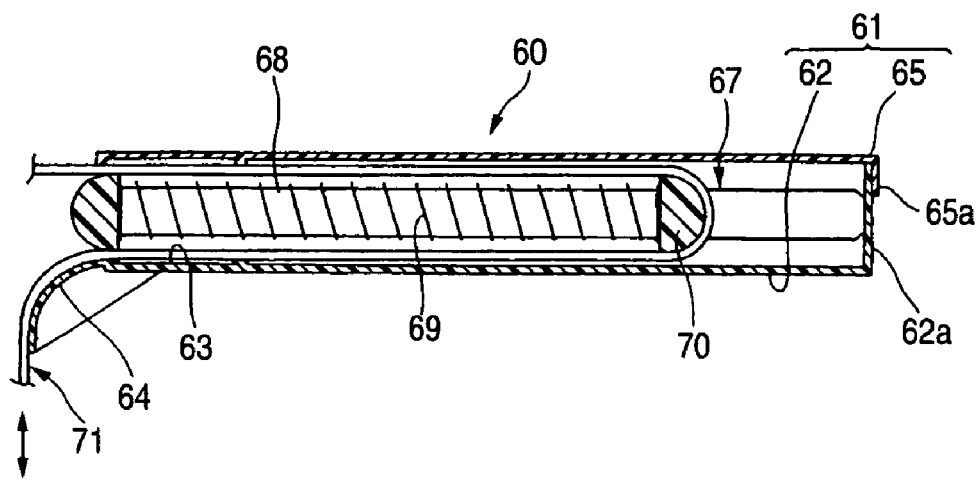
FIG. 5 is a cross sectional view showing one example of the conventional art wire-excessive portion absorbing device.
Figure 6:
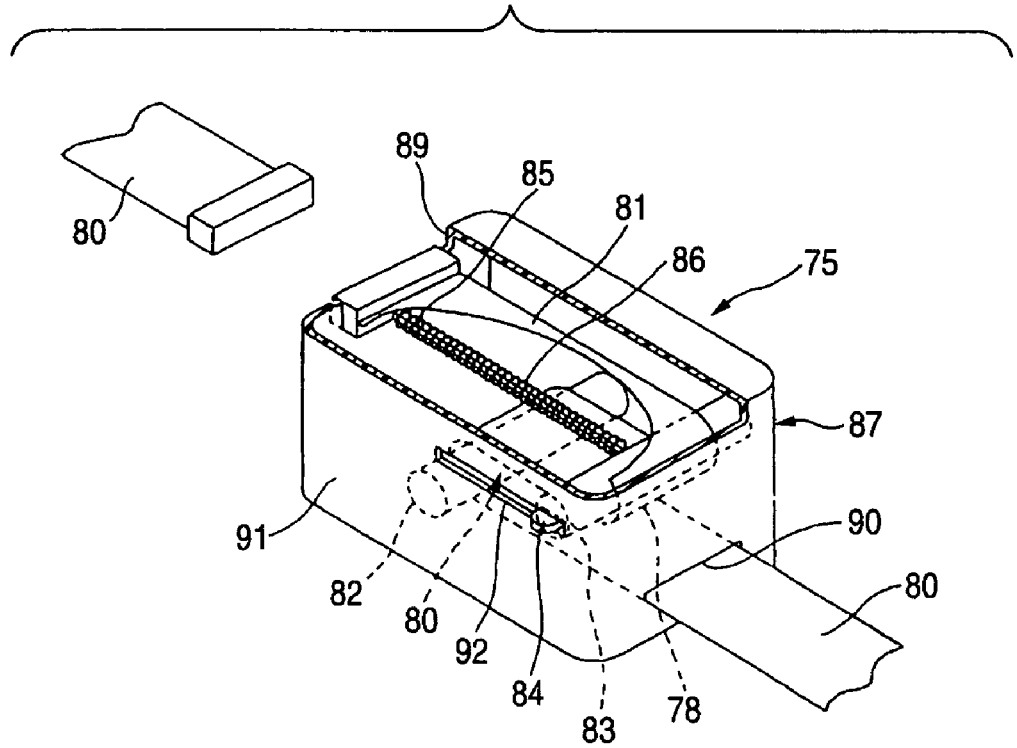
FIG. 6 is a cross sectional view showing another example of the conventional art wire-excessive portion absorbing device.

The side wall 34c of one side is provided at its rear side with the wire inlet mouth 39 for pulling the wire 53 from the direction transverse with the wire 38 led out from the wire outlet mouth 38 (FIG. 4). The wire inlet mouth 39 is formed to have the enough width similarly to the wire outlet mouth 38. The wire 53 led into the wire inlet mouth 39 is bent at right angle within the case 31.

The excessive portion 53a of the wire 53 received in the case main body 32 is wound in U-turn on the moving roller 46, and is always urged in the pulling direction by the compression coil spring 47, and since it is received in the case main body 32 without being loosened, the case 31 may be formed to be in half size of the excessive portion 53a of the wire 53, so that the case 31 may be reduced in size.

The cover 40 has a shape enabling to protect the opening of the lower side of the case main body 32. The cover 40 is provided in an edge wall 41 with a plurality of engaging pawls 42a being in mesh with the engaging frame 36 formed at the peripheral wall 34 of the case main body 32. When the cover 40 is attached to the case main body 32, the wire 53 is avoided from rising in the excessive portion 53a.

The excessive portion absorbing unit 30 comprises the moving roller 46 reciprocating within the case main body 32, the compression coil spring 47 urging the moving roller 46, and the guide pin 45 furnished outside with the compression coil spring 47. The moving roller 46 is formed with the resin, comprising the belly part 46a and a ring-shaped frame part (not shown) continuing to both sides of the belly part 46a. The belly part 46a has a half-cylindrical part on which the wire 53 is wound, and a face contacting the wire 53 is smooth in curved face.

Therefore, the wire 53 is smoothly bent following the curved face, so that this part is prevented from concentration of the bending stress caused by the wire 53 being broken. The frame parts at both sides are formed for inserting the guiding pin 45 without interference.

The compression coil spring 47 is furnished outside on the guide pin 45. The compression coil spring 47 is seated at one end part on the spring reception part 45a of the guide pin 45, and contacted at the other end part to the lower end of the moving roller 46.

The guide pin 45 is a bar-like straight member formed with the resin. One end of the guide pin 45 is the spring reception part 45a to be seated on the rear wall part 34b. The guide pin 45 contacts at the other end to the wall 34a of the front side.

As mentioned above, if the wire-excessive portion absorbing device 30 of this embodiment is served together with the harness-guide protector 10, the absorption of the excessive portion 53a of the wire 53 can be smoothly performed when opening and closing the door, and abnormal noises caused by loosening the wire 53 can be avoided, so that it is possible to offer the wire-excessive portion absorbing structure excellent in the connecting reliability and quietness. Even if kinds or grades of cars are changed, the wire-excessive portion absorbing structure can be used without exchanging the wire-excessive portion absorbing device 30.

The invention is not limited to the above mentioned embodiment, but can be practiced in various modifications so far as not getting over the essence of the invention.

What is claimed is:

1. A wire-excessive portion absorbing structure comprising:
   a guide protector comprising:
      a guide main body for slidably inserting an electric wire from one side to the other side;
      a cover protecting an opening of said guide main body and preventing the wire from rising; and
      a wire guiding part provided in curve for restraining the leading direction of the wire at the guide main body so that the wire is guided following a guiding face of said wire guiding part; and
   a wire-excessive portion absorbing device absorbing an excessive length of said wire;
   wherein, said guide protector is formed separate from said wire-excessive portion absorbing device; wherein said wire-excessive portion absorbing device includes a moving roller for coiling the electric wire, a compression coil spring, and a guide pin, said moving roller reciprocating within said wire-excessive portion absorbing device, said compression coil spring urging said moving roller in a wire pulling direction, and said guide pin being furnished outside of the compression coil spring for linearly moving said moving roller; and wherein the guide protector is located on the electric wire at a separated distance from the wire-excessive portion absorbing device.

2. A wire-excessive portion absorbing structure as claimed in claim 1, wherein said curve of said wire guiding part has a corner radius that is equal to or greater than a minimum allowable bending radius of said wire.

3. A wire-excessive portion absorbing structure as claimed in claim 1, wherein said wire guiding part is projected from the end portion of said cover, and a wall part opposite to the guiding face of said wire guiding part is released.

4. A wire-excessive portion absorbing structure as claimed in claim 1, wherein the guide protector is fixed to an upper buckling force at a side of a car body to render said wire guiding part to face, at its front end, a trunk of a moving side of the car body.

5. A wire-excessive portion absorbing structure as claimed in claim 1, wherein the guide main body is formed substantially within a region defined by the thickness of the wire-excessive portion absorbing device.

* * * * *